(12) United States Patent
Adam

(10) Patent No.: US 12,229,999 B2
(45) Date of Patent: Feb. 18, 2025

(54) SYSTEMS AND METHODS FOR SHARING ANALYTICAL RESOURCES IN A CAMERA NETWORK

(71) Applicant: Tyco Fire & Security GmbH, Neuhausen am Rheinfall (CH)

(72) Inventor: Lipphei Adam, Nolensville, TN (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 26 days.

(21) Appl. No.: 17/571,146

(22) Filed: Jan. 7, 2022

(65) Prior Publication Data

US 2023/0222692 A1 Jul. 13, 2023

(51) Int. Cl.
*G06T 7/00* (2017.01)
*H04N 7/18* (2006.01)

(52) U.S. Cl.
CPC ............... *G06T 7/97* (2017.01); *H04N 7/181* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 11,178,363 B1 | 11/2021 | Qian et al. | |
| 2019/0050718 A1 | 2/2019 | Tickoo et al. | |
| 2019/0171885 A1 | 6/2019 | Chau et al. | |
| 2020/0258240 A1* | 8/2020 | Spampinato | G06T 7/215 |
| 2020/0403933 A1* | 12/2020 | Jiao | H04L 67/10 |
| 2022/0006960 A1* | 1/2022 | Kim | H04N 5/2628 |
| 2022/0044045 A1* | 2/2022 | Grancharov | G06V 20/52 |
| 2022/0365348 A1* | 11/2022 | Hanumante | G06F 1/3265 |
| 2023/0115371 A1* | 4/2023 | Park | G06V 20/56 |
| | | | 382/103 |

FOREIGN PATENT DOCUMENTS

WO 2007121476 A1 10/2007

OTHER PUBLICATIONS

International Search Report and Written Opinion in PCT/US2023/060077, mailed Mar. 17, 2023, 15 pages.

* cited by examiner

*Primary Examiner* — Gelek W Topgyal
(74) *Attorney, Agent, or Firm* — ArentFox Schiff LLP

(57) ABSTRACT

Example implementations include a method, apparatus, and computer-readable medium for sharing analytical resources in a camera network, comprising capturing a video clip comprising a set of image frames via a first camera having only non-artificial intelligence (A.I) features, wherein the first camera is part of a camera network. The implementations further include identifying, in the camera network, a second camera that has an A.I feature. The implementations further include determining whether the second camera has bandwidth to analyze the video clip. The implementations include transmitting, via the first camera, the video clip to the second camera for analysis using the A.I feature, in response to determining that the second camera has bandwidth. The implementations include receiving, by the first camera from the second camera, metadata comprising results of the analysis using the A.I feature and generating, for display on a user interface, the video clip with the metadata.

19 Claims, 7 Drawing Sheets

400

---

602 Transmitting, via the first camera, the video clip to the third camera for analysis using the A.I feature, in response to determining that the second camera does not have the bandwidth

604 Receiving, by the first camera from the third camera, the metadata comprising results of the analysis using the A.I feature

606 Generating, for display on the user interface, the video clip with the metadata

702 Determining, based on a plurality of rules, whether to select the second camera or the third camera for providing the analysis, wherein the plurality of rules query one or more of feature availability, time restrictions, or network connectivity

704 Identifying the second camera to provide the analysis based on the plurality of rules

Fig. 7

SYSTEMS AND METHODS FOR SHARING ANALYTICAL RESOURCES IN A CAMERA NETWORK

TECHNICAL FIELD

The described aspects relate to camera-based security systems.

BACKGROUND

Aspects of the present disclosure relate generally to security systems, and more particularly, to sharing analytical resources in a camera network.

Security systems often rely on cameras to capture visual events and present surveillance clips to users. Not all cameras are built equally however. As technology has progressed, newer cameras have begun to include artificial intelligence (A.I) features such as the ability to detect people, animals, vehicles, etc. An A.I-enabled camera may be able to, for example, provide a user with a surveillance clip and automatically highlight events such as package deliveries. Thus, a user is able to quickly identify key events without manually navigating through all of the videos/images captured.

A camera-based security system may include multiple different types of cameras in one network. Due to cost restrictions and installation requirements, only some cameras in the network may offer A.I features. Several other cameras in the network may have basic recording and uploading capabilities. Accordingly, the enhanced security features are not leveraged by the entire network, leaving security gaps and a lack of accessibility.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for sharing analytical resources in a camera network, comprising capturing a video clip comprising a set of image frames via a first camera having only non-artificial intelligence (A.I) features, wherein the first camera is part of a camera network comprising a plurality of cameras, and wherein the first camera is configured to present captured video clips through a user interface associated with the first camera. The method further includes identifying, in the camera network, a second camera that has an A.I feature. Additionally, the method further includes determining whether the second camera has bandwidth to analyze the video clip. Additionally, the method further includes transmitting, via the first camera, the video clip to the second camera for analysis using the A.I feature, in response to determining that the second camera has the bandwidth. Additionally, the method further includes receiving, by the first camera from the second camera, metadata comprising results of the analysis using the A.I feature. Additionally, the method further includes generating, for display on the user interface, the video clip with the metadata.

Another example implementation includes an apparatus for sharing analytical resources in a camera network, comprising a memory and a processor in communication with the memory. The processor is configured to capture a video clip comprising a set of image frames via a first camera having only non-artificial intelligence (A.I) features, wherein the first camera is part of a camera network comprising a plurality of cameras, and wherein the first camera is configured to present captured video clips through a user interface associated with the first camera. The processor is further configured to identify, in the camera network, a second camera that has an A.I feature. Additionally, the processor further configured to determine whether the second camera has bandwidth to analyze the video clip. Additionally, the processor further configured to transmit, via the first camera, the video clip to the second camera for analysis using the A.I feature, in response to determining that the second camera has the bandwidth. Additionally, the processor further configured to receive, by the first camera from the second camera, metadata comprising results of the analysis using the A.I feature. Additionally, the processor further configured to generate, for display on the user interface, the video clip with the metadata.

Another example implementation includes an apparatus for sharing analytical resources in a camera network, comprising means for capturing a video clip comprising a set of image frames via a first camera having only non-artificial intelligence (A.I) features, wherein the first camera is part of a camera network comprising a plurality of cameras, and wherein the first camera is configured to present captured video clips through a user interface associated with the first camera. The apparatus further includes means for identifying, in the camera network, a second camera that has an A.I feature. Additionally, the apparatus further includes means for determining whether the second camera has bandwidth to analyze the video clip. Additionally, the apparatus further includes means for transmitting, via the first camera, the video clip to the second camera for analysis using the A.I feature, in response to determining that the second camera has the bandwidth. Additionally, the apparatus further includes means for receiving, by the first camera from the second camera, metadata comprising results of the analysis using the A.I feature. Additionally, the apparatus further includes means for generating, for display on the user interface, the video clip with the metadata.

Another example implementation includes a computer-readable medium storing instructions for sharing analytical resources in a camera network, the instructions executable by a processor to capture a video clip comprising a set of image frames via a first camera having only non-artificial intelligence (A.I) features, wherein the first camera is part of a camera network comprising a plurality of cameras, and wherein the first camera is configured to present captured video clips through a user interface associated with the first camera. The instructions are further executable to identify, in the camera network, a second camera that has an A.I feature. Additionally, the instructions are further executable to determine whether the second camera has bandwidth to analyze the video clip. Additionally, the instructions are further executable to transmit, via the first camera, the video clip to the second camera for analysis using the A.I feature, in response to determining that the second camera has the bandwidth. Additionally, the instructions are further executable to receive, by the first camera from the second camera, metadata comprising results of the analysis using the A.I feature. Additionally, the instructions are further executable to generate, for display on the user interface, the video clip with the metadata.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 6 is a flowchart illustrating a method of sharing analytical resources with a camera that has bandwidth, in accordance with exemplary aspects of the present disclosure.

FIG. 7 is a flowchart illustrating a method of selecting a camera based on a plurality of rules, in accordance with exemplary aspects of the present disclosure.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure presents two classes of cameras. One class includes artificial intelligence (A.I)-enabled cameras that have A.I capabilities. These A.I capabilities may include object detection, facial detection, photo enhancement, or any other computer vision technique that can improve security efficiency. The other class includes cameras that are not A.I-enabled (i.e., do not have A.I capabilities). These cameras may simply record video or offer basic software features such as night vision and motion detection. Unlike the A.I features listed above that use computer vision, machine learning, and/or neural networks, features such as motion detection only require basic computation (e.g., frame-to-frame differentials).

To overcome the shortcomings of conventional security systems in which only a limited number of cameras in a network have A.I capabilities, the present disclosure describes systems and methods for sharing analytical resources in a camera network. More specifically, the present disclosure describes leveraging the abilities of the A.I-enabled cameras by sending frames captured from a camera that is not A.I-enabled to a camera that is A.I-enabled. The sent frames are treated as a frame belonging to the A.I-enabled camera, and are analyzed by one or more of the A.I. capabilities of the A.I-enabled camera. Subsequent to the analysis, the A.I-enabled camera returns the frames (e.g., with tagged objects in the frame based on the analysis by the one or more A.I. capabilities) to the camera that is not A.I-enabled, which presents the returned frames and associated A.I.-tagged information through its associated user interface.

Figure 1:
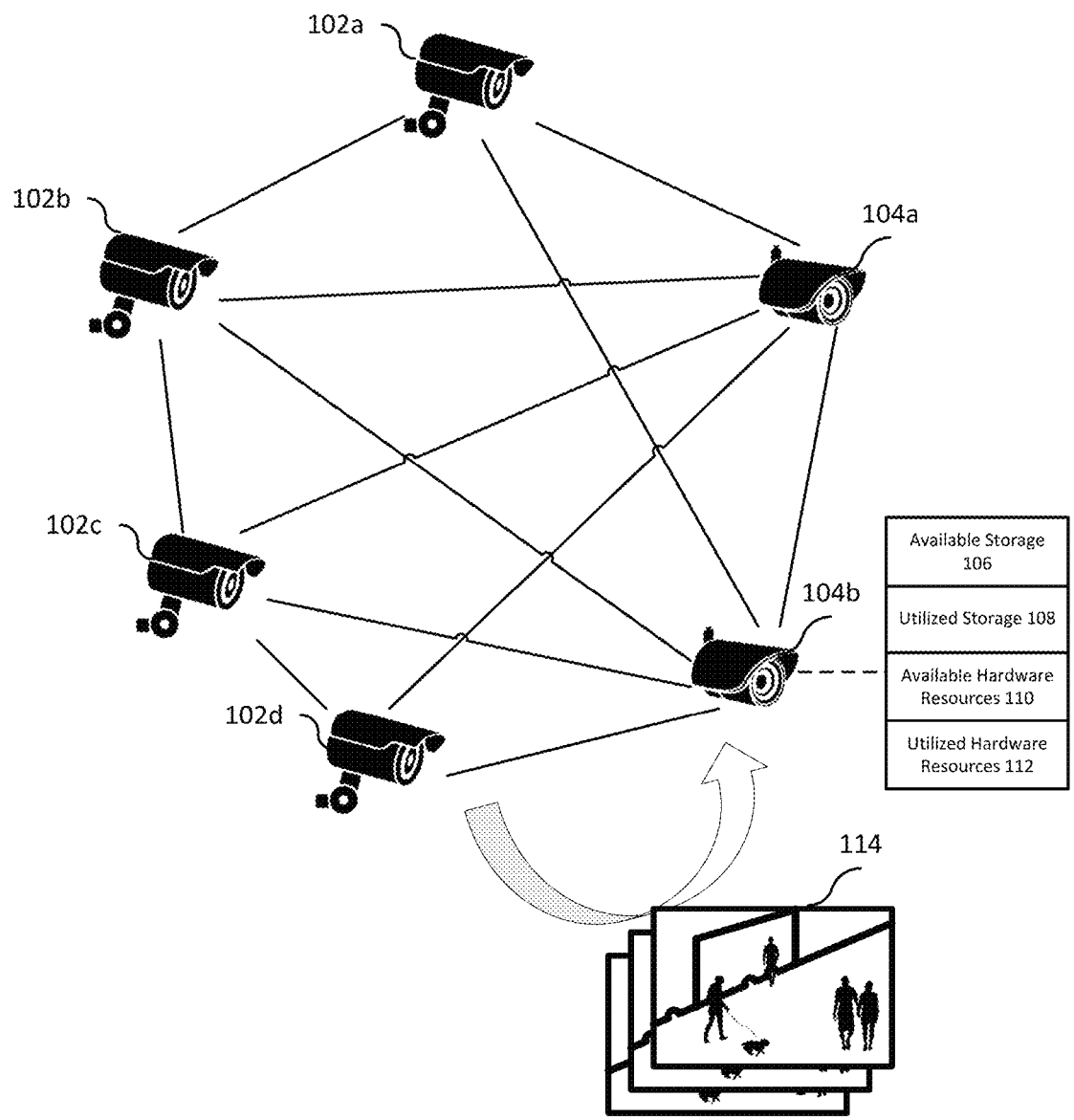
FIG. 1 is a diagram of a camera network in which analytical resources are shared, in accordance with exemplary aspects of the present disclosure.

FIG. 1 is a diagram of camera network 100 in which analytical resources are shared, in accordance with exemplary aspects of the present disclosure. Camera network 100 includes a plurality of cameras. Camera 102a, camera 102b, camera 102c, and camera 102d are not A.I-enabled. Camera 104a and camera 104b are A.I-enabled. Each camera may be connected via a network such as a local area network or a wide area network (e.g., the Internet). Utilizing this connection, camera 102d may determine whether camera 104b has bandwidth to receive and analyze frame(s) 114. The bandwidth may be determined based on any combination of available storage 106, utilized storage 108, available hardware resources 110, and utilized hardware resources 112 of camera 104b.

Figure 2:
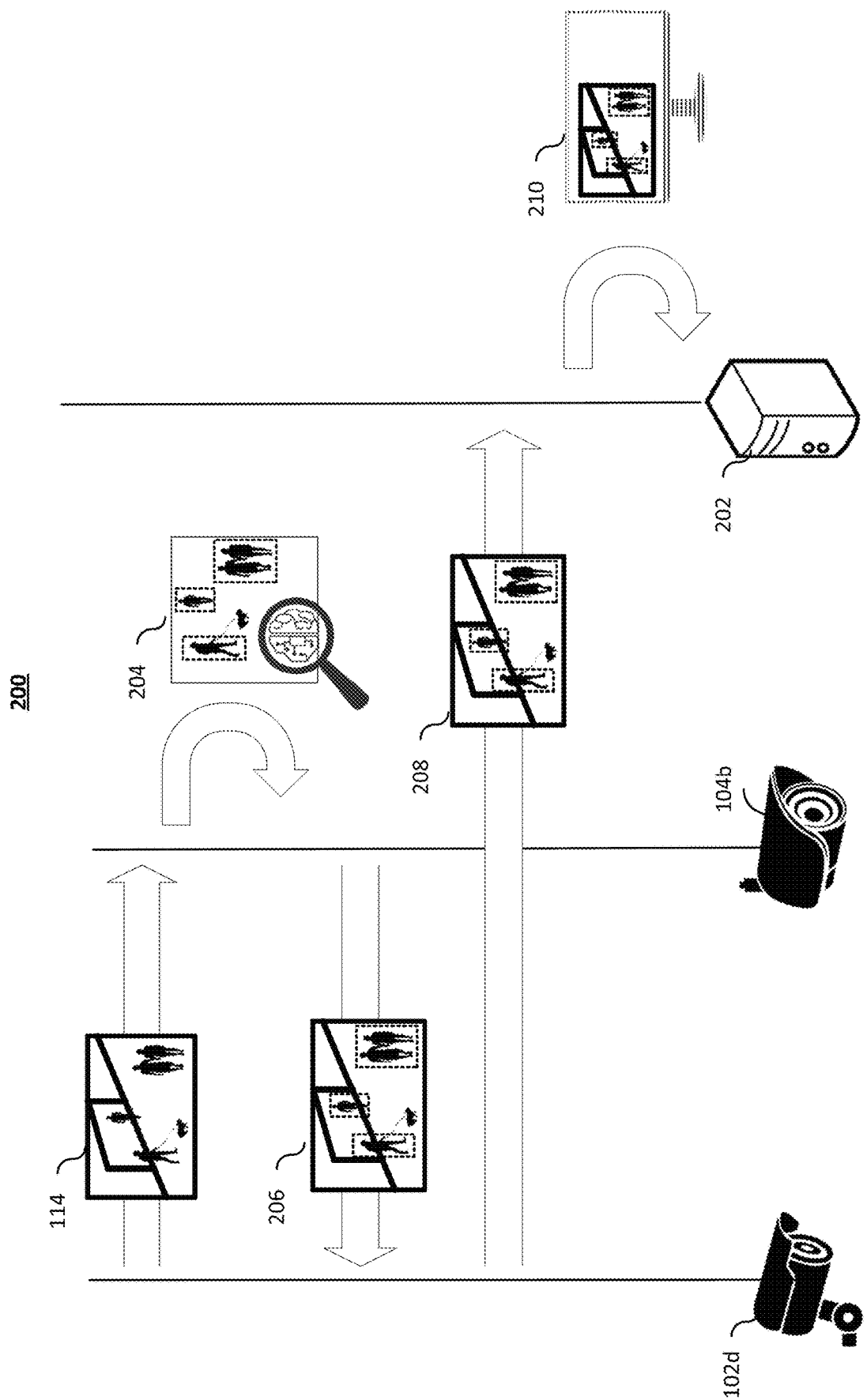
FIG. 2 is a message flow diagram of the communication between an A.I-enabled camera, a camera that is not A.I-enabled, and a user interface device, in accordance with exemplary aspects of the present disclosure.

FIG. 2 is flow diagram 200 of the communication between A.I-enabled camera 104b, camera 102d that is not A.I-enabled, and user interface device 202, in accordance with exemplary aspects of the present disclosure. Camera 102d transmits frame 114 to camera 104b for analysis using an A.I feature (e.g., objection detection, object classification, etc.). Camera 104b then performs analysis 204. For example, camera 104b may detect persons in frame 114 and generate boundary boxes around the detected persons. Camera 104b may return metadata 206 to camera 102d. Metadata 206 includes the results of analysis 204 (e.g., locations and sizes of the boundary boxes around the detected persons in frame 114). Camera 102d forwards metadata 206 and frame 114 as a new frame 208 (e.g., a frame that includes the boundary boxes indicated by metadata 206) to user interface device 202. User interface device 202 generates, for display, frame 208 on user interface 210, which is associated with camera 102d. In some aspects, frame 208 may be stored to further improve the A.I models (e.g., by re-training the algorithms) of cameras 104.

Figure 3:
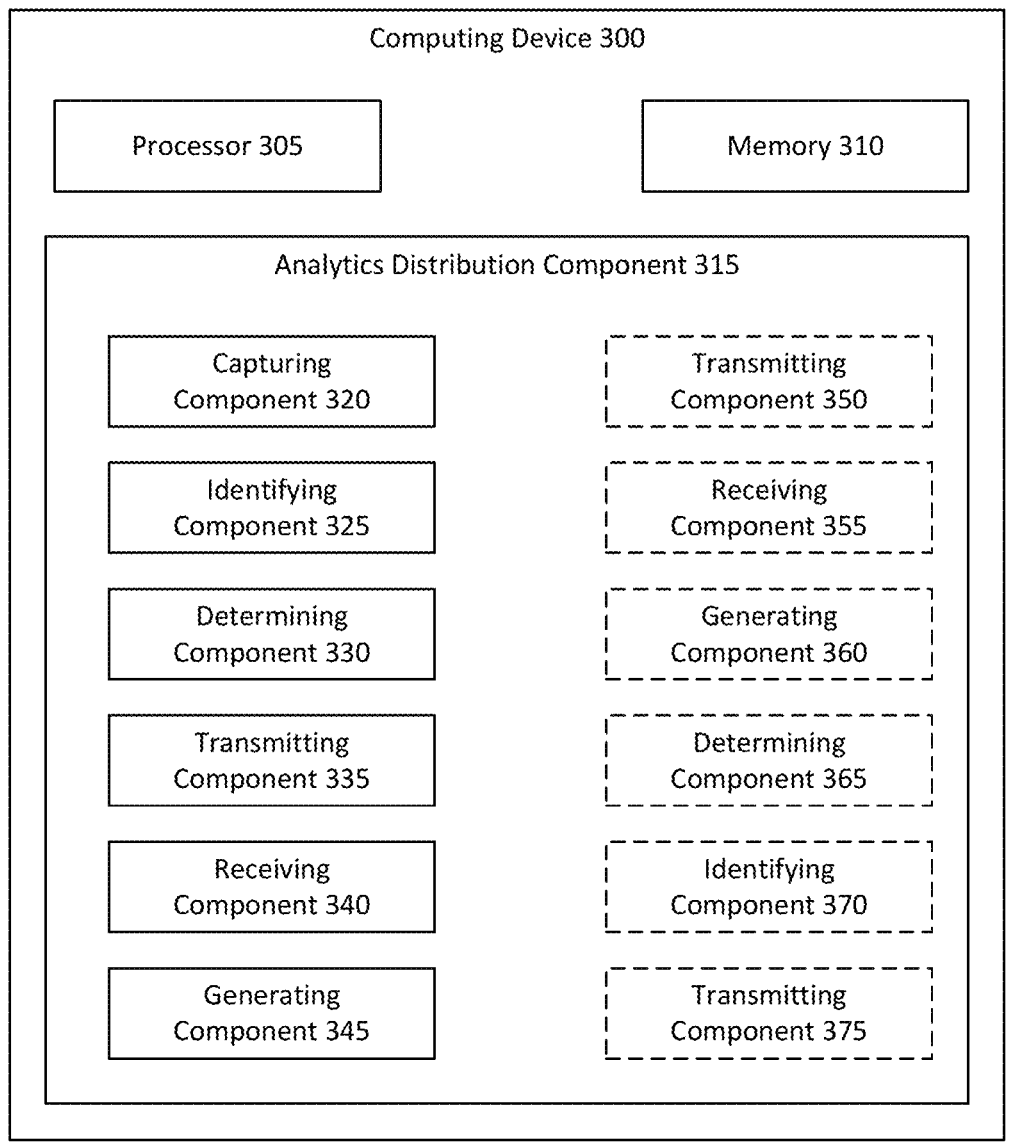
FIG. 3 is a block diagram of a computing device executing an analytics distribution component, in accordance with exemplary aspects of the present disclosure.
Figure 4:
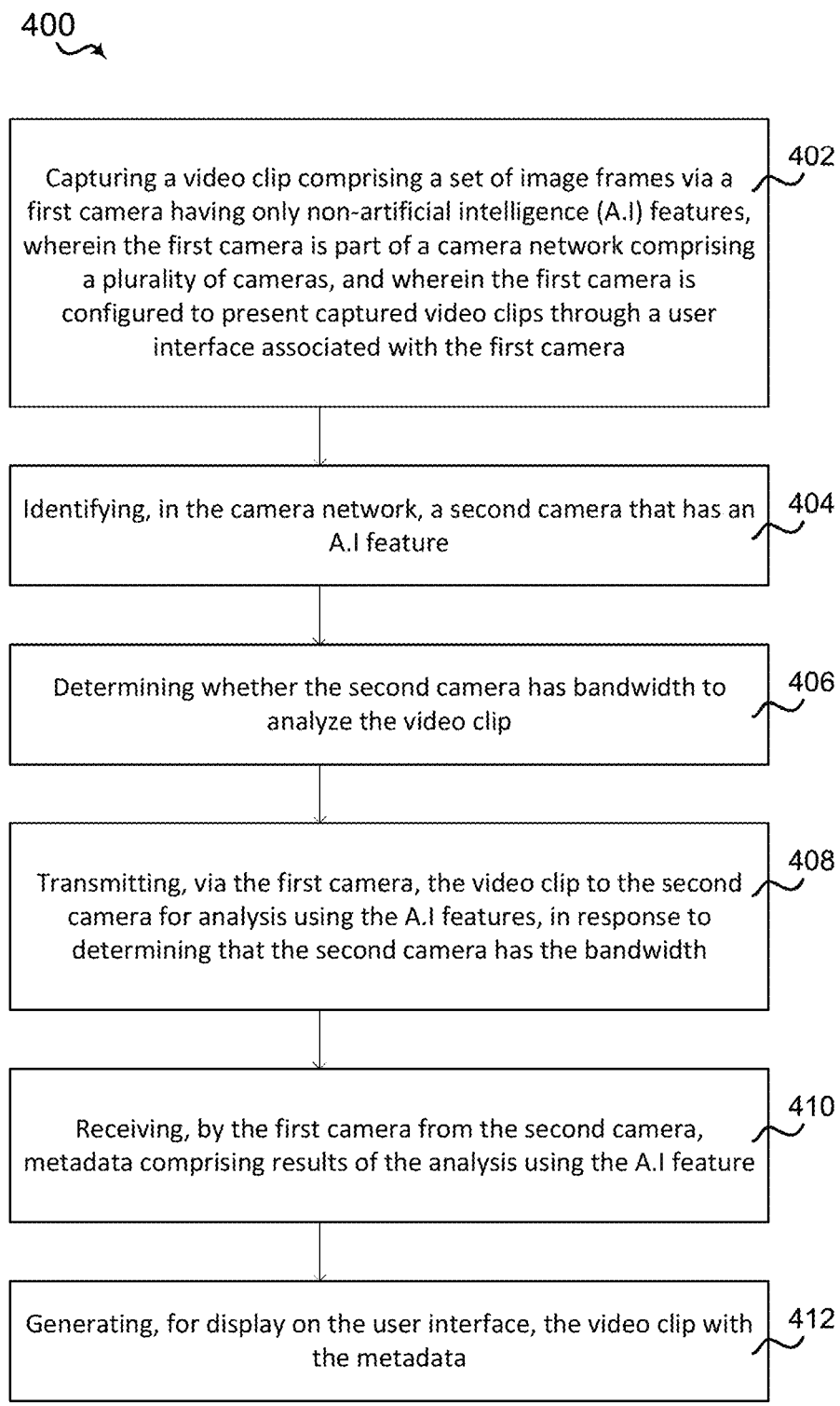
FIG. 4 is a flowchart illustrating a method of sharing analytical resources in a camera network, in accordance with exemplary aspects of the present disclosure.

Referring to FIG. 3 and FIG. 4, in operation, computing device 300 may perform a method 400 of wireless communication, by such as via execution of analytics distribution component 315 by processor 305 and/or memory 310. For example, computing device 300 may represent any of the cameras 104 and/or 102 in FIG. 1 or may be in communication with at least one of said cameras.

At block 402, the method 400 includes capturing a video clip comprising a set of image frames via a first camera having only non-artificial intelligence (A.I) features, wherein the first camera is part of a camera network comprising a plurality of cameras, and wherein the first camera is configured to present captured video clips through a user interface associated with the first camera.

For example, in an aspect, computing device 300, processor 305, memory 310, analytics distribution component 315, and/or capturing component 320 may be configured to or may comprise means for capturing, via a first camera (e.g., camera 102*d*) having only non-artificial intelligence (A.I) features (e.g., motion detection), a video clip comprising a set of image frames 114. Camera 102*d* may be part of camera network 100 comprising a plurality of cameras (e.g., camera 104*a*, camera 104*b*, etc.). Camera 102*d* may be configured to present captured video clips through user interface 210 associated with the first camera. In some aspects, user interface 210 may be generated on user interface device 202.

For example, camera 102*d* may be located in an office environment and may capture surveillance clips. To avoid capturing video when nothing eventful is happening, camera 102*d* may be configured to capture video when motion is detected or a sound is detected.

At block 404, the method 400 includes identifying, in the camera network, a second camera that has an A.I feature. For example, in an aspect, computing device 300, processor 305, memory 310, analytics distribution component 315, and/or identifying component 325 may be configured to or may comprise means for identifying, in camera network 100, a second camera that has an A.I feature (e.g., camera 104*b*).

For example, when a camera is added to camera network 100, the camera may transmit a message to each member of camera network 100 with an indication of whether the camera is A.I-enabled and the types of A.I features supported by the camera. Accordingly, when camera 104*b* or camera 104*a* joined camera network 100, each respective camera 104 exchanged feature information with cameras 102 of camera network 100. Camera 104*b* may inform camera 102*d* that, for example, camera 104*b* is A.I-enabled and can perform analysis using A.I-features involving object detection (e.g., person detection, animal detection, vehicle detection, etc.). Camera 102*d* may store this information in its local memory and refer to the information when deciding where to send frames 114.

At block 406, the method 400 includes determining whether the second camera has bandwidth to analyze the video clip. For example, in an aspect, computing device 300, processor 305, memory 310, analytics distribution component 315, and/or determining component 330 may be configured to or may comprise means for determining whether camera 104*b* has bandwidth to analyze the video clip.

As mentioned previously, each camera has a local storage and hardware resources. When determining whether a camera has bandwidth, determining component 330 determines whether there is available storage and available hardware resources to accommodate the analysis of the video clip. In terms of storage, determining component 330 may compare the size of the video clip (e.g., 50 Mb) with the available storage size of camera 104*b* (e.g., 100 Mb). In terms of hardware resources, determining component 330 may determine whether there is enough random access memory (RAM) (e.g., more than a minimum amount needed for analysis), whether the CPU utilization is less than a threshold amount (e.g., 80%), or whether a GPU in camera 104*b* is available to perform analysis.

At block 408, the method 400 includes transmitting, via the first camera, the video clip to the second camera for analysis using the A.I feature, in response to determining that the second camera has the bandwidth. For example, in an aspect, computing device 300, processor 305, memory 310, analytics distribution component 315, and/or transmitting component 335 may be configured to or may comprise means for transmitting, via camera 102*d*, the video clip (e.g., frame(s) 114) to camera 104*b* for analysis using the A.I feature, in response to determining that the second camera has the bandwidth.

For example, camera 104*b* may periodically transmit a broadcast message to cameras in camera network 100 indicating that camera 104*b* has bandwidth to perform analysis using the A.I feature and a timestamp. In some aspects, camera 104*b* may perform a self-evaluation of bandwidth based on available storage 106, utilized storage 108, available hardware resources 110, and/or utilized hardware resources 112. In response to determining that bandwidth is available, camera 104*b* may inform other cameras (e.g., camera 102*d*). When camera 102*d* receives the broadcast message and determines that camera 104*b* has bandwidth, camera 102*d* may transmit frames 114 to camera 104*b* and include a request to perform the analysis.

In some aspects, transmitting the video clip to the second camera (e.g., camera 104*b*) is in response to detecting one or more of: motion, a sound effect of interest (e.g., a bang), or an object of interest (e.g., a face) in the video clip. For example, camera 102*d* may capture multiple video frames, but may only select a subset of the video frames for analysis by an A.I-enabled camera. The frames in the subset may specifically be selected because the subset of the video frames includes motion for example.

At block 410, the method 400 includes receiving, by the first camera from the second camera, metadata comprising results of the analysis using the A.I feature. For example, in an aspect, computing device 300, processor 305, memory 310, analytics distribution component 315, and/or receiving component 340 may be configured to or may comprise means for receiving, by the first camera from the second camera, metadata comprising results of the analysis using the A.I feature.

In an aspect, the A.I feature comprises at least one of: object detection, object tracking, facial detection, biometric recognition, environmental event detection, or software-based image enhancement. For example, camera 104*b* may identify, in frame(s) 114, persons, faces, fingerprints, weather effects (e.g., rain, floods, fires, etc.), etc. Camera 104*b* may also enhance images (e.g., by increasing sharpness, zooming into a portion of the image and upsampling the pixels in that portion, etc.). It should be noted that camera 104*b* is configured to receive an input frame, perform an analysis described above, and output a verdict. The present disclosure leverages this process by providing camera 104*b* with input frames that are not captured by camera 104*b*. In this case, the A.I features of camera 104*b* are applied to the frames from non-A.I enabled cameras, and thus A.I functionality is extended throughout camera network 100.

Under normal operation, camera 104*b* may capture frames (e.g., frame 1*a*, frame 2*a*, frame 3*a*, frame 4*a*), analyze the frames using the A.I feature, and output analyzed frames (e.g., frame 1*b*, frame 2*b*, frame 3*b*, frame 4*b*). The analyzed frames may include a verdict, which may be presented on a user interface associated with camera 104*b*. For example, camera 104*b* may detect water using computer vision, and generate a verdict that the environment being monitored is experiencing a flood. The user interface of camera 104*b* may be presented on an application installed on a user interface device 202 (e.g., a computer, a smartphone, a tablet, etc.). The verdict may be generated as a visual alert on the user interface. In one aspect, all cameras in camera network 200 present information on the same user interface. In another aspect, each camera has its own user interface. In yet another aspect, cameras with the same operating system and firmware share a user interface.

When camera 104b receives frames 114 (e.g., frame 1c, frame 2c), the analyzed output frames may be frame 1d and frame 2d. To prevent these frames from being presented with output frames 1b, 2b, 3b, and 4b and cause confusion as some frames show a first environment and some frames show a second environment, camera 104b may generate a unique tag for each of the frames received from other cameras in camera network 100. A tag may be include an identifier of the source camera (e.g., a MAC address) and a timestamp associated with the corresponding frame). Output frames based on input frames with said tags may be stored in a different directory in the memory of camera 104b. These output frames are filtered out and not shown with the outputs corresponding to frames directly captured on camera 104b.

In an aspect, the second camera is configured to accommodate the analysis of the video clip by reducing, for a given period of time, an amount of frames analyzed that are locally captured by the second camera. Because camera 104b may be capturing frames and performing an analysis in real-time, in order to accommodate the analysis of frames from other cameras, camera 104b may reduce the number of locally captured frames that are input for analysis. For example, camera 104b may capture frames 1a, 2a, 3a, and 4a, but may only analyze frames 1a and 2a. In the place of frames 3a and 4a, camera 104b may instead analyze frames 1c and 2c. Thus the analysis sequence becomes frames 1a, 2a, 1c, and 2c. Because camera 104b may capture several frames per second (e.g., 60 frames per second), not analyzing duplicate frames should not greatly impact performance of camera 104b.

In an aspect, the A.I feature is object detection, and receiving the metadata comprises receiving a plurality of object identifiers that label objects in each frame of the video clip. For example, the objects may be persons. For each person identified, camera 104b may generate a verdict that indicates that a person has been found and the pixel coordinates of the person. The metadata may include a plurality of these object identifiers that further indicate a frame number in addition to pixel coordinates and an identifier (e.g., a temporary name such as "person1").

At block 412, the method 400 includes generating, for display on the user interface, the video clip with the metadata. For example, in an aspect, computing device 300, processor 305, memory 310, analytics distribution component 315, and/or generating component 345 may be configured to or may comprise means for generating, for display on user interface 210, the video clip with the metadata (e.g., frame 208). For example, camera 102d may transmit the analyzed video clip to user interface device 202. A security officer may review the analyzed video clip via user interface 210. In some aspects, where the A.I feature is object detection, the plurality of object identifiers described above comprise dimensions and positions of boundary boxes that border objects in each frame of the video clip. For example, a machine learning algorithm in camera 104b may identify persons in a frame and generate boundary boxes that enhance visual identification. The metadata may include a size of each box in pixels (e.g., 40 pixels by 100 pixels) and a position (e.g., a center point around pixel (1000, 987)). When generating the video clip with the metadata on the user interface, user interface 210 may present the boundary boxes in one or more frames of the video clip based on the dimensions and positions.

Figure 5:
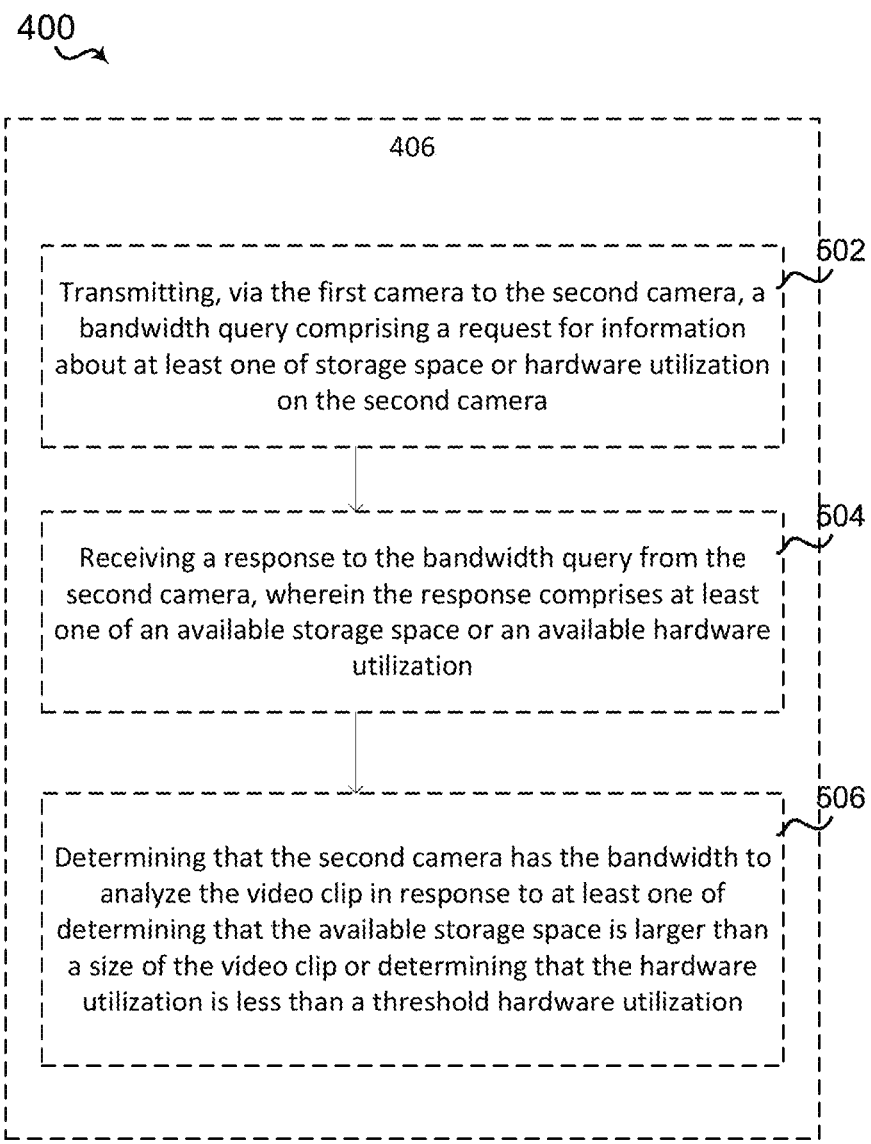
FIG. 5 is a flowchart illustrating a method for evaluating camera bandwidth, in accordance with exemplary aspects of the present disclosure.

Referring to FIG. 5, in an optional aspect, at block 502, the determining at block 406 of whether the second camera has the bandwidth to analyze the video clip further includes transmitting, via the first camera to the second camera, a bandwidth query comprises a request for information about at least one of storage space or hardware utilization on the second camera. In an example, camera 102d may request information about available storage 106 (e.g., 500 Mb), utilized storage 108 (1 Gb), available hardware resources 110 (e.g., 1 Gb RAM, 50% CPU, etc.), and utilized hardware resources (e.g., 0.5 Gb RAM, 50% CPU, etc.) of camera 104b.

In this optional aspect, at block 504, the determining at block 406 of whether the second camera has the bandwidth to analyze the video clip further includes receiving a response to the bandwidth query from the second camera, wherein the response comprises at least one of an available storage space or an available hardware utilization.

In this optional aspect, at block 506, the determining at block 406 of whether the second camera has the bandwidth to analyze the video clip further includes determining that the second camera has the bandwidth to analyze the video clip in response to at least one of determining that the available storage space is larger than a size of the video clip or determining that the hardware utilization is less than a threshold hardware utilization.

For example, camera 102d may intend to send a video that is 400 Mb large. Based on the received data from camera 104b, camera 102d may determine that there is enough available storage 106 in camera 104b to receive the video. Furthermore, the threshold hardware utilization may be a quantitative value that is the maximum amount of utilization that camera 104b can sustain. If the hardware utilization of camera 104b is higher than the threshold, camera 104b cannot perform analysis on videos from any more cameras. The hardware utilization may be a function of RAM, CPU utilization, network connectivity speeds, etc. Camera 102d may determine the hardware utilization and compare the determined value with the threshold hardware utilization. In response to determining that there is storage space available and hardware to accommodate analysis of the video clip, camera 102d determines that camera 104b has bandwidth.

It should be noted that this approach is different from the one described previously where camera 104b determines bandwidth and informs the other cameras of availability. Either approach may be taken depending on the preferences of the system administrator of camera network 100.

Referring to FIG. 6, in an optional aspect wherein the camera network includes a third camera with the A.I feature, at block 602, the method 400 may further include transmitting, via the first camera, the video clip to the third camera for analysis using the A.I feature, in response to determining that the second camera does not have the bandwidth. For example, in an aspect, computing device 300, processor 305, memory 310, analytics distribution component 315, and/or transmitting component 350 may be configured to or may comprise means for transmitting, via camera 102d, the video clip to camera 104a for analysis using the A.I feature, in response to determining that the camera 104b does not have the bandwidth.

For example, at a given time, camera 104b may be unavailable to accept frames from camera 102d. This may be because camera 104b may be receiving frames from cameras 102a, 102b, and/or camera 102c. This may also be because camera 102d cannot access camera 104b due to a poor network connection or because camera 104b may be offline/turned off. Camera 104a may indicate available bandwidth (e.g., via a broadcast message) and accordingly, camera 102d may send the video clip to camera 104a.

In this optional aspect, at block 604, the method 400 may further include receiving, by the first camera from the third camera, the metadata comprising results of the analysis using the A.I feature. For example, in an aspect, computing device 300, processor 305, memory 310, analytics distribution component 315, and/or receiving component 355 may be configured to or may comprise means for receiving, by camera 102d from camera 104a, the metadata comprising results of the analysis using the A.I feature.

In this optional aspect, at block 606, the method 400 may further include generating, for display on the user interface, the video clip with the metadata. For example, in an aspect, computing device 300, processor 305, memory 310, analytics distribution component 315, and/or generating component 360 may be configured to or may comprise means for generating, for display on user interface 210, the video clip with the metadata.

Referring to FIG. 7, in an optional aspect wherein the camera network includes a third camera with the A.I feature, at block 702, the identifying 404 of the second camera may further include determining, based on a plurality of rules, whether to select the second camera or the third camera for providing the analysis, wherein the plurality of rules query one or more of feature availability, time restrictions, or network connectivity.

For example, in an aspect, computing device 300, processor 305, memory 310, analytics distribution component 315, and/or determining component 365 may be configured to or may comprise means for determining, based on a plurality of rules, whether to select camera 104b or camera 104a for providing the analysis, wherein the plurality of rules query one or more of feature availability, time restrictions, or network connectivity.

For example, the plurality of rules may be stored in the local memory of each non-A.I enabled camera of camera network 100. Each rule may be structured as an if/else statement. For example, a first rule may state "if [[current time]] is between [[12:00 am]] and [[6:00 am]], transmit frame to [[camera 104a]], else transmit to [[camera 104b]]." Each rule may be adjustable by a user. For example, the information in the brackets shown above can be changed (e.g., 12:00 am may be changed to 1:00 am). A second rule may state "if applying [[weather detection]], transmit frame to [[camera 104a]]." A third rule may state "if applying [[facial detection]] transmit frame to [[camera 104b]]." A fourth rule may state "if network upload speed with [[camera 104]] is less than [[2 Mbps]], do not transmit to [[camera 104a]]."

In this optional aspect, at block 704, the identifying 404 of the second camera may further include identifying the second camera to provide the analysis based on the plurality of rules. For example, in an aspect, computing device 300, processor 305, memory 310, analytics distribution component 315, and/or identifying component 370 may be configured to or may comprise means for identifying camera 104b to provide the analysis based on the plurality of rules.

Figure 8:
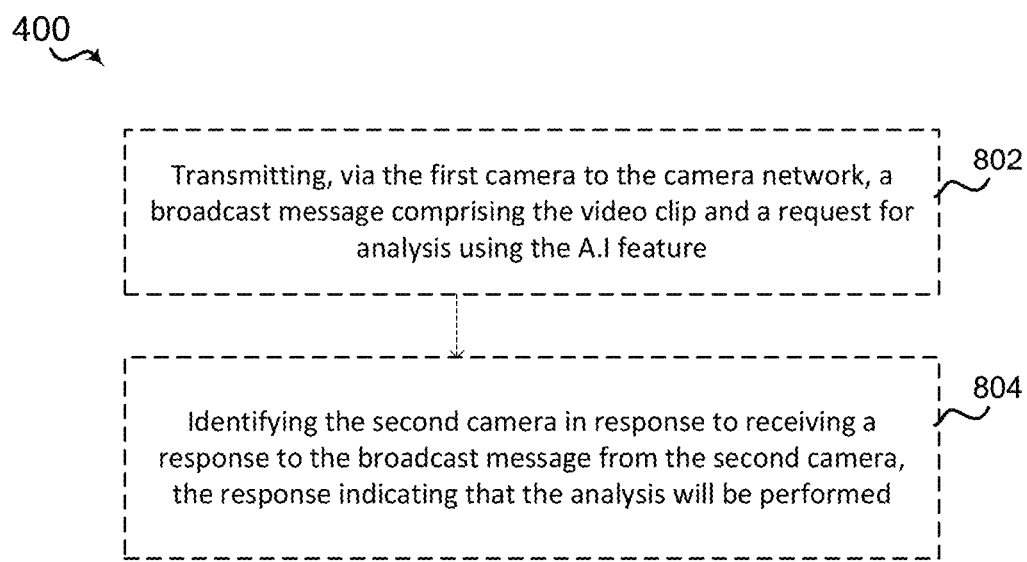
FIG. 8 is a flowchart illustrating a method of identifying a camera in the camera network, in accordance with exemplary aspects of the present disclosure.

Referring to FIG. 8, in an optional aspect, at block 802, the method 400 may further include transmitting, via the first camera to the camera network, a broadcast message comprising the video clip and a request for analysis using the A.I feature. For example, in an aspect, computing device 300, processor 305, memory 310, analytics distribution component 315, and/or transmitting component 375 may be configured to or may comprise means for transmitting, via camera 102d to camera network 100, a broadcast message comprising the video clip and a request for analysis using the A.I feature.

In this optional aspect, at block 804, the method 400 may further include identifying the second camera in response to receiving a response to the broadcast message from the second camera, the response indicating that the analysis will be performed. For example, in an aspect, computing device 300, processor 305, memory 310, and/or analytics distribution component 315, may be configured to or may comprise means for identifying camera 104b in response to receiving a response to the broadcast message from camera 104b, the response indicating that the analysis will be performed.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for sharing analytical resources in a camera network, comprising:
    capturing a video clip comprising a set of image frames via a first camera having only non-artificial intelligence (A.I) features, wherein the first camera is part of a camera network comprising a plurality of cameras, and wherein the first camera is configured to present captured video clips through a user interface associated with the first camera;
    identifying, in the camera network, a second camera that has an A.I feature;
    determining whether the second camera has bandwidth to analyze the video clip;
    transmitting, via the first camera, the video clip to the second camera for analysis using the A.I feature, in response to determining that the second camera has the bandwidth, wherein the second camera is configured to accommodate the analysis of the video clip by:
        reducing, for a given period of time, an amount of frames to analyze that are locally captured by the second camera by a first number of frames; and
        analyzing, from the video clip, a subset of image frames equal in count to the first number of frames, wherein the subset of image frames are analyzed in place of frames that are locally captured by the second camera in the given period of time;
    receiving, by the first camera from the second camera, metadata comprising results of the analysis using the A.I feature; and
    generating, for display on the user interface, the video clip with the metadata.

2. The method of claim 1, wherein the A.I feature comprises at least one of object detection, object tracking, facial detection, biometric recognition, environmental event detection, or software-based image enhancement.

3. The method of claim 1, wherein the A.I feature is object detection, and wherein receiving the metadata comprises receiving a plurality of object identifiers that label objects in each frame of the video clip.

4. The method of claim 3, wherein the plurality of object identifiers comprise dimensions and positions of boundary boxes that border objects in each frame of the video clip, and wherein generating the video clip with the metadata on the user interface comprises generating the boundary boxes in one or more frames of the video clip based on the dimensions and positions.

5. The method of claim 1, wherein determining whether the second camera has the bandwidth to analyze the video clip further comprises:
   transmitting, via the first camera to the second camera, a bandwidth query comprising a request for information about at least one of storage space or hardware utilization on the second camera;
   receiving a response to the bandwidth query from the second camera, wherein the response comprises at least one of an available storage space or an available hardware utilization;
   determining that the second camera has the bandwidth to analyze the video clip in response to at least one of determining that the available storage space is larger than a size of the video clip or determining that the hardware utilization is less than a threshold hardware utilization.

6. The method of claim 1, wherein the camera network includes a third camera with the A.I feature, further comprising:
   transmitting, via the first camera, the video clip to the third camera for analysis using the A.I feature, in response to determining that the second camera does not have the bandwidth;
   receiving, by the first camera from the third camera, the metadata comprising results of the analysis using the A.I feature; and
   generating, for display on the user interface, the video clip with the metadata.

7. The method of claim 1, wherein the camera network includes a third camera with the A.I feature, wherein identifying the second camera comprises:
   determining, based on a plurality of rules, whether to select the second camera or the third camera for providing the analysis, wherein the plurality of rules query one or more of feature availability, time restrictions, or network connectivity; and
   identifying the second camera to provide the analysis based on the plurality of rules.

8. The method of claim 1, further comprising:
   transmitting, via the first camera to the camera network, a broadcast message comprising the video clip and a request for analysis using the A.I feature; and
   wherein the second camera is identified in response to receiving a response to the broadcast message from the second camera, the response indicating that the analysis will be performed.

9. The method of claim 1, wherein transmitting the video clip to the second camera is in response to detecting motion in the video clip.

10. An apparatus for sharing analytical resources in a camera network, comprising:
    a memory; and
    a processor in communication with the memory and configured to:
       capture a video clip comprising a set of image frames via a first camera having only non-artificial intelligence (A.I) features, wherein the first camera is part of a camera network comprising a plurality of cameras, and wherein the first camera is configured to present captured video clips through a user interface associated with the first camera;
       identify, in the camera network, a second camera that has an A.I feature;
       determine whether the second camera has bandwidth to analyze the video clip;
       transmit, via the first camera, the video clip to the second camera for analysis using the A.I feature, in response to determine that the second camera has the bandwidth, wherein the second camera is configured to accommodate the analysis of the video clip by:
          reducing, for a given period of time, an amount of frames to analyze that are locally captured by the second camera by a first number of frames; and
          analyzing, from the video clip, a subset of image frames equal in count to the first number of frames, wherein the subset of image frames are analyzed in place of frames that are locally captured by the second camera in the given period of time;
       receive, by the first camera from the second camera, metadata comprising results of the analysis using the A.I feature; and
       generate, for display on the user interface, the video clip with the metadata.

11. The apparatus of claim 10, wherein the A.I feature comprises at least one of: object detection, object tracking, facial detection, biometric recognition, environmental event detection, or software-based image enhancement.

12. The apparatus of claim 10, wherein the A.I feature is object detection, and wherein to receive the metadata comprises to receive a plurality of object identifiers that label objects in each frame of the video clip.

13. The apparatus of claim 12, wherein the plurality of object identifiers comprise dimensions and positions of boundary boxes that border objects in each frame of the video clip, and wherein to generate the video clip with the metadata on the user interface comprises to generate the boundary boxes in one or more frames of the video clip based on the dimensions and positions.

14. The apparatus of claim 10, wherein to determine whether the second camera has the bandwidth to analyze the video clip the processor is further configured to:
    transmit, via the first camera to the second camera, a bandwidth query comprising a request for information about at least one of storage space or hardware utilization on the second camera;
    receive a response to the bandwidth query from the second camera, wherein the response comprises at least one of an available storage space or an available hardware utilization;
    determine that the second camera has the bandwidth to analyze the video clip in response to at least one of determining that the available storage space is larger than a size of the video clip or determining that the hardware utilization is less than a threshold hardware utilization.

15. The apparatus of claim 10, wherein the camera network includes a third camera with the A.I feature, wherein the processor is further configured to:
    transmit, via the first camera, the video clip to the third camera for analysis using the A.I feature, in response to determine that the second camera does not have the bandwidth;
    receive, by the first camera from the third camera, the metadata comprising results of the analysis using the A.I feature; and
    generate, for display on the user interface, the video clip with the metadata.

16. The apparatus of claim 10, wherein the camera network includes a third camera with the A.I feature, wherein to identify the second camera comprises to:
  determine, based on a plurality of rules, whether to select the second camera or the third camera for providing the analysis, wherein the plurality of rules query one or more of feature availability, time restrictions, or network connectivity; and
  identify the second camera to provide the analysis based on the plurality of rules.

17. The apparatus of claim 10, wherein the processor is further configured to:
  transmit, via the first camera to the camera network, a broadcast message comprising the video clip and a request for analysis using the A.I feature; and
  wherein the second camera is identified in response to receive a response to the broadcast message from the second camera, the response indicating that the analysis will be performed.

18. The apparatus of claim 10, wherein to transmit the video clip to the second camera is in response to detect motion in the video clip.

19. A computer-readable medium storing instructions for sharing analytical resources in a camera network, the instructions executable by a processor to:
  capture a video clip comprising a set of image frames via a first camera having only non-artificial intelligence (A.I) features, wherein the first camera is part of a camera network comprising a plurality of cameras, and wherein the first camera is configured to present captured video clips through a user interface associated with the first camera;
  identify, in the camera network, a second camera that has an A.I feature;
  transmit, via the first camera, the video clip to the second camera for analysis using the A.I feature, wherein the second camera is configured to accommodate the analysis of the video clip by:
    reducing, for a given period of time, an amount of frames to analyze that are locally captured by the second camera by a first number of frames; and
    analyzing, from the video clip, a subset of image frames equal in count to the first number of frames, wherein the subset of image frames are analyzed in place of frames that are locally captured by the second camera in the given period of time;
  receive, by the first camera from the second camera, metadata comprising results of the analysis using the A.I feature; and
  generate, for display on the user interface, the video clip with the metadata.

* * * * *